R. E. WAKEMAN.
CULTIVATOR ATTACHMENT.
APPLICATION FILED JAN. 28, 1916.
1,230,243.
Patented June 19, 1917.
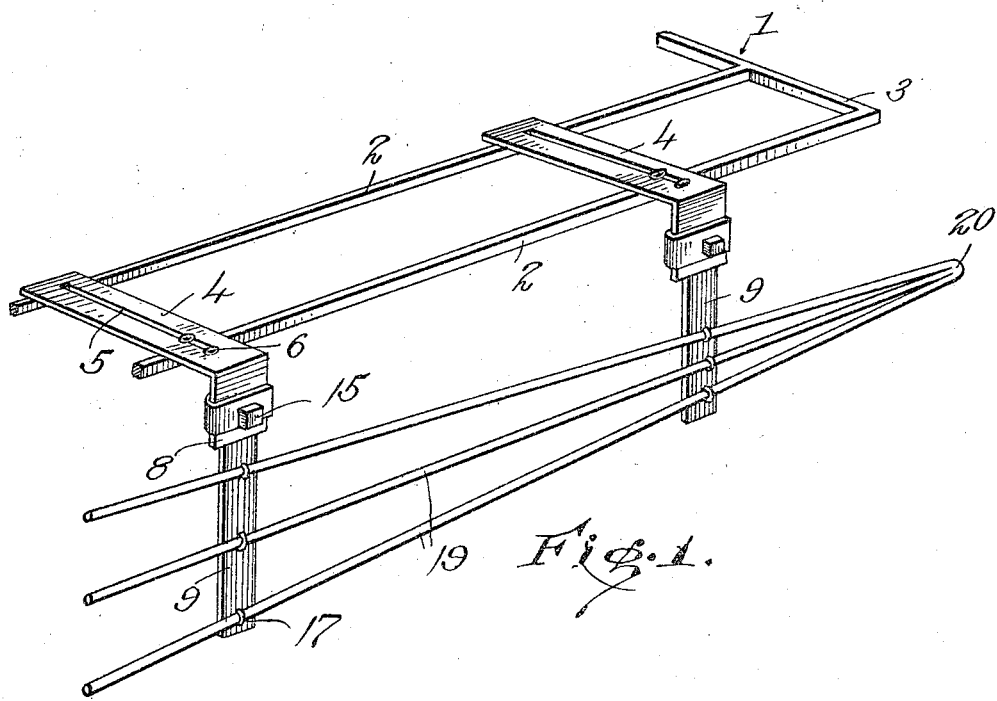
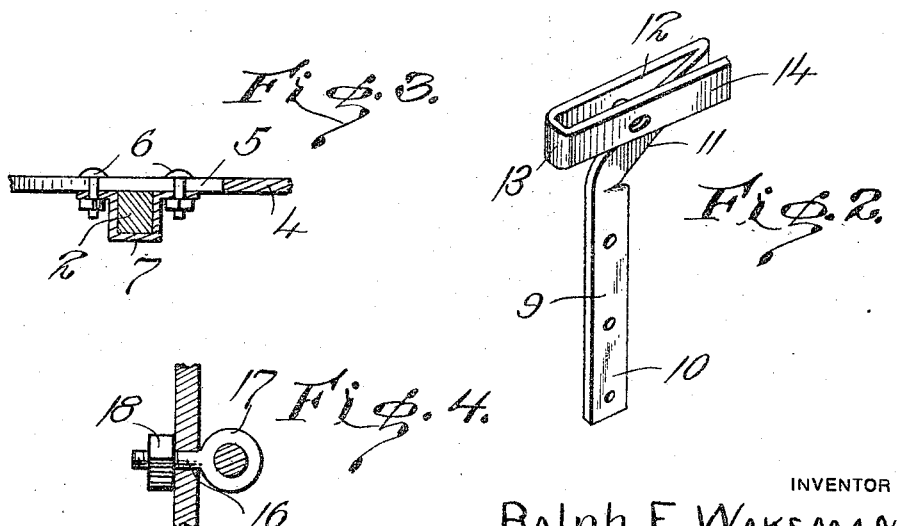
WITNESSES
H. F. Costello
Carroll Bailey
INVENTOR
Ralph E. Wakeman
BY Richard Owen
ATTORNEY

UNITED STATES PATENT OFFICE.

RALPH E. WAKEMAN, OF KENTS HILL, MAINE.

CULTIVATOR ATTACHMENT.

1,230,243.  Specification of Letters Patent.  Patented June 19, 1917.

Application filed January 28, 1916. Serial No. 74,836.

*To all whom it may concern:*

Be it known that I, RALPH E. WAKEMAN, a citizen of the United States, residing at Kents Hill, in the county of Kennebec and State of Maine, have invented certain new and useful Improvements in Cultivator Attachments, of which the following is a specification.

This invention relates to cultivator attachments and has for its object to provide an attachment which will raise the foliage of plants to prevent covering of the same by the soil upturned by the teeth of the cultivator.

The invention consists in the novel features of construction, combination and arrangements of parts, as will be hereinafter more fully described, illustrated in the accompanying drawings, and claimed.

In the drawings:—

Figure 1 is a perspective view showing the application of the device to a cultivator frame.

Fig. 2 is a detail perspective view of one of the adjustable rod carrying members.

Fig. 3 is a detail sectional view showing the manner in which the attachment is adjustably mounted relative to the cultivator frame; and Fig. 4 is a detail sectional view showing the manner of attaching the rods to the adjustable support therefor.

Referring to the drawings by numerals wherein is illustrated the preferred embodiment of my invention, 1 designates a cultivator frame of any desired construction which includes longitudinally extending bars 2 and transverse connecting bars 3. The improved attachment is adapted to be applied to the frame 1 in advance of the teeth of the cultivator, as will be understood and it is to be further understood that one or more of the attachments may be provided upon each side of the frame so as to raise the drooping foliage of plants when the cultivator is operated to cultivate two or more rows.

A pair of plates 4 of similar construction are arranged upon the side bars 2 of the cultivator frame and are provided with longitudinally extending slots 5 through which are passed bolts 6. A bracket 7 is arranged beneath each of the plates 4 and about the outer rod of the frame and has the bolts 6 connected therewith as is illustrated in Fig. 3 of the drawings so that by loosening the bolts, the plates may be adjusted laterally with respect to the frame. The bolts may then be tightened to lock the plates in any desired adjusted position.

The outer ends of each of the plates 4 are bent downwardly as at 8 at substantially right angles to the body portion of the plates and mounted upon each of these downwardly extending portions for vertical adjustment thereon, are rod carrying bars 9. Two bars 9 are provided one for supporting either end of the rods for raising foliage of the plants and since each of these portions of the attachment are of similar construction, a detailed description of but one will suffice for both.

Each of the bars 9 is formed from a relatively narrow strip of sheet metal and comprises a vertically extending portion 10 which is bent at its upper end at an angle to itself as indicated at 11 and is then bent again to extend at substantially right angles to the vertically extending portion and above the same, as indicated at 12. Another short bend is made at 13 and the end of the strip is then disposed in spaced parallel relation with the portion 12 as indicated at 14. This provides a loop which receives the angularly extending end of the plate 4 for vertical adjustment thereon. This bar 9 may be formed in a number of different ways and may be locked in any vertical adjusted position relative to the portion 8 of the plate in any desired manner but for simplicity of construction and operation, I provide in the portion 14 thereof, a set screw 15 which is adapted to engage the angular portion of the plate and thus lock the bar thereto as will be understood.

A plurality of spaced openings are provided in each of the bars 9 to receive the shanks 16 of eye members 17, nuts 18 being threaded upon the shanks to hold the eye-members within the openings. A plurality of rods 19 have their forward ends brought into engagement and secured together as indicated at 20 in the drawings, while the rear ends of these rods are arranged in spaced relation and in alinement so that a substantially triangularly shaped frame is provided. These rods 19 are adapted to be passed through the openings in the eye members 17 and be thus secured to the bars 9.

In operation, the pointed end 20 of the outer frame engages beneath the foliage of the plants to be cultivated near the ground and as the cultivator is moved forward, the foliage will ride upon the bars 19 and be raised from engagement with the ground so that as the cultivator blades pass by the plants, the soil is turned up and the same will be thrown under the foliage of the plants as will be understood, the cultivator teeth being arranged at a point near the rear terminal ends of the bars 19 so that the soil will be turned up before the plants have become disengaged from the bars.

From the construction of the device, it will be seen that the bars 19 may be readily adjusted as an entirety both laterally and vertically to thus adapt the device to machines of various construction and for various purposes.

From the foregoing description taken in connection with the accompanying drawings, it is thought that the construction and operation of my improved cultivator attachments will be readily understood and while I have herein shown and described one preferred embodiment of my invention, I do not wish to be limited thereto except for such limitations as the claims may impart.

I claim:

1. The combination with a cultivator frame including parallel bars, horizontal plates mounted on the frame and each having one end thereof extending downwardly, adjustable bars having loops formed upon their upper ends detachably engaged with the downwardly turned ends of the horizontal plates, a plurality of foliage raising rods arranged one above the other and connected at their forward ends, the outermost rods being arranged in divergent relation with respect to each other, and means for detachably connecting the rods to the bars.

2. The combination with a cultivator frame, supporting plates connected therewith, vertically adjustable supporting bars connected with the supporting plates, a plurality of eyes carried by the vertically adjustable bars, and a plurality of foliage raising rods arranged one above the other and extending through the eyes.

3. The combination with a cultivator frame, of a plurality of foliage raising rods diverging from their forward ends and positioned one above the other, and means for supporting said rods below the side of the frame.

4. The combination with a cultivator frame, of a plurality of foliage raising rods positioned one above the other and converging toward their forward ends at which point they are connected, supporting members for said rods, and means for adjustably mounting said supporting members below and to the side of the cultivator frame.

5. The combination with a cultivator frame of a plurality of foliage raising rods connected at their forward ends and positioned one above another, said rods diverging toward their rear ends, and means for suspending said rods from the side of said cultivator frame.

6. The combination with a cultivator frame including parallel bars, of supporting plates having longitudinal slots therein, U-shaped clamping members engaged about the bars of the cultivator frame, detachable bolts extending through the slots in the plates and engaged with the U-shaped clamping members whereby the plates may be adjusted horizontally with respect to the cultivator frame, and a plurality of foliage raising rods carried by the supporting plates arranged one above the other and connected at their forward ends.

7. The combination with a cultivator frame including parallel bars, of supporting plates having longitudinal slots therein, U-shaped clamping members engaged about the bars of the cultivator frame, detachable bolts extending through the slots in the plates and engaged in the U-shaped clamping members whereby the plates may be adjusted horizontally with respect to the cultivator frame, one end of each of the supporting plates being extended downwardly, supporting bars having loops formed upon their upper ends and adjustably engaged with the downwardly extending ends of the supporting plates, a plurality of eyes arranged in vertical alinement on the supporting bars, and a plurality of connected foliage raising rods extending through the base.

8. In an attachment for earth working implements comprising supporting plates adapted to be attached to the earth working implement and provided with downwardly extending ends, supporting bars adjustably engaged with the downwardly turned ends, a plurality of eyes carried by the supporting bars, and a plurality of rods extending through the eyes and connected together at their forward ends.

In testimony whereof I affix my signature in presence of two witnesses.

RALPH E. WAKEMAN.

Witnesses:
  DONALD GORDON,
  VERDA GORDON.

Copies of this patent may be obtained for five cents each, by addressing the "Commissioner of Patents, Washington, D. C."